United States Patent Office  3,481,885
Patented Dec. 2, 1969

3,481,885
POLYARYLENE DISULFIMIDE SULFONES
Eduard Radlmann, Gerhard Dieter Wolf, Horst Wieden, and Günther Nischk, Dormagen, Germany, assignors to Farbenfabriken Bayer Aktiengesellschaft, Leverkusen, Germany, a corporation of Germany
No Drawing. Filed Dec. 14, 1967, Ser. No. 690,386
Claims priority, application Germany, Dec. 21, 1966, F 51,034
Int. Cl. C08g 25/00, 33/02
U.S. Cl. 260—2.2    1 Claim

ABSTRACT OF THE DISCLOSURE

The invention relates to new linear polyarylene disulfimide sulfones which are produced by reacting polychlorodiphenylsulfones of the general formula

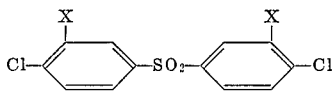

wherein X represents chlorine or hydrogen with an alkali metal salt of a bis-hydroxyaryl disulfimide of the general formula

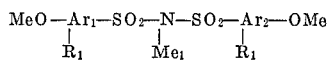

wherein $Ar_1$ and $Ar_2$ represent phenylene or naphthylene, $R_1$ and $R_2$ represent hydrogen, a $C_1$ to $C_4$ alkyl radical, a nitro group or a halogen atom, and Me and $Me_1$ represent an alkali metal atom, optionally together with up to 98 mol percent of alkali metal salt of a dihydroxy aromatic compound.

---

The invention relates to linear polyarylene disulfimide sulfones and to a process for their preparation by reacting polychlorodiphenylsulfones with bis-hydroxyaryl disulfimides.

It is known to react alkali metal salts of mononuclear or polynuclear bisphenols at elevated temperatures in polar organic solvents with optionally substituted bis-(4-halophenyl) compounds in which the phenyl rings are linked by an electron attractive group, to form polyarylene ether sulfones. The products show good resistance to degradation by oxidation and acid or basic hydrolysis. Because of their neutral behavior, they show no affinity either to acid or to basic compounds. Such affinity however would be of particular interest in enabling these products to be used as ionic exchangers or to make them capable of being dyed.

It is an object of this invention to provide new polyarylene disulfimide sulfones which do not have the disadvantages mentioned above. It is a further object of this invention to provide a process for the production of such polyarylene disulfimide sulfones.

The polyarylene disulfimide sulfones according to the invention have the recurring structural unit

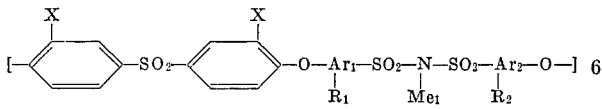

wherein X represents chlorine or hydrogen, $Ar_1$ and $Ar_2$ both represent phenylene or naphthylene, $R_1$ and $R_2$ both represent hydrogen, a $C_1$–$C_4$ alkyl radical, a nitrogroup or a halogen atom, and $Me_1$ represents an alkali metal atom.

Also included in the scope of the present invention are polyarylene disulfimide sulfones having recurring structural units of the general formula:

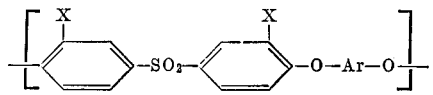

wherein X has the meaning as given above and Ar is a bivalent aromatic radical derived from a dihydroxy aromatic compound, about 2–100 mol percent of said bivalent aromatic radical having the general formula:

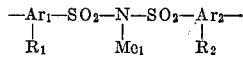

wherein $Ar_1$, $Ar_2$, $R_2$ and $Me_1$ have the meaning as given above, and the remainder, in the amount of 0–98 mol percent, having the general formula:

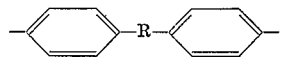

wherein R is a bivalent aliphatic, cycloaliphatic, or araliphatic radical having 1–9 C-atoms or the group —O—, —S—, —SO—, —SO$_2$—, —CO—, or a single bond.

The linear polyarylene disulfimide sulfones are produced by reacting a polychlorodiphenyl sulfone of the general formula

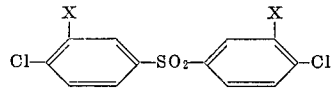   I wherein X represents chlorine or hydrogen, with an alkali metal salt of a bis-hydroxyaryldisulfimide of the general formula

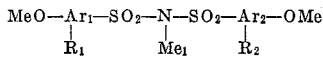   II wherein $Ar_1$ and $Ar_2$ represent phenylene or naphthylene, $R_1$ and $R_2$ represent hydrogen, a $C_1$ to $C_4$ radical, a nitro group or a halogen atom, and Me and $Me_1$ represent an alkali metal atom, said reaction being carried out in a polar organic solvent at temperatures from 90 to 160° C.

Surprisingly, even in the case of X being chlorine, only those chlorine atoms of polychlorodiphenylsulfone react with alkali phenolate groups that are in the 4-position, so that exclusively linear polymers are obtained.

Suitable polychlorodiphenylsulfones of the above Formula I are 3,3',4,4'-tetrachloro-diphenylsulfone, 3,4,4'-trichlorodiphenylsulfone and 4,4'-dichloro-diphenylsulfone.

Examples of suitable, optionally substituted, bis-hydroxyaryldisulfimides which are reacted in the form of their alkali metal salts of the general Formula II are bis-(3-nitro-4-hydroxyphenyl)-disulfimide,
bis-(3-methyl-4-hydroxyphenyl)-disulfimide,
bis-(3-chloro-4-hydroxyphenyl)-disulfimide,
bis-(3-hydroxyphenyl)-disulfimide,
bis-(3-hydroxy-4-methylphenyl)-disulfimide,
bis-(3-hydroxy-5-methylphenyl)-disulfimide,
4-hydroxyphenyl-4'-hydroxy-naphthyl-disulfimide,
3 - nitro - 4 - hydroxy - phenyl - 4' - hydroxy - naphthyl-disulfimide,
bis-(4-hydroxynaphthyl)-disulfimide and
bis-(3-hydroxynaphthyl)-disulfimide, and in particular bis-(4-hydroxyphenyl)-disulfimide. Such compounds can be prepared by a procedure analogous to those indicated in Ber. 75, 532 (1942) and Z. obsc. Chim. 34, 4054 (1964). Lithium, potassium and caesium salts of the optionally substituted bis-hydroxyaryl-disulfimides are suitable for the preparation of the polymers of which the potassium salts are preferred because of higher reactivity and lower expenses. Generally the corresponding hydroxides, alcoholates or hydrides of the alkali metals are used as starting materials for the preparation of the alkali metal salts of bis-hydroxyaryl-disulfimides. Since the bis-hydroxyaryl-disulfimides carry three hydrogen atoms of different acidity that are replaceable by alkali, it is quite possible to use mixed alkali metal salts. For example, one mole of a bis-hydroxyaryl-disulfimide is first reacted with a molar equivalent of sodium hydroxide to form bis-hydroxyaryl-disulfimide sodium which is then converted with two further molar equivalents of potassium hydroxide to the mixed alkali metal salt of bis-hydroxyaryl-disulfimide which is suitable for the formation of polymers.

Polar organic solvents suitable for the reaction according to the invention are diethylsulfoxide, dimethylsulfone, diethylsulfone, diisopropylsulfone and tetramethylene sulfone. Dimethylsulfoxide however is a preferred solvent.

In order to vary the amount of acid disulfimide groups in the polymer, the lithium, sodium, potassium or caesium salts of bis-phenols may be used in addition for the preparation of polymers. The amount of disulfimide groups per kilogram of polymer substance should be at least 50 meq. The alkali metal salts of bis-phenols which may be added and which are obtained by reacting bis-phenol with two molar equivalents of the corresponding alkali metal hydroxide, alcoholate or hydride are the salts of mononuclear bis-phenols, such as hydroquinone and resorcinol, or compounds of the general formula

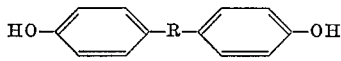

wherein R represents a bivalent aliphatic, cycloaliphatic or araliphatic radical with 1 to 9 C-atoms or the group —O—, —S—, —SO—, —SO$_2$— or —CO— or a single bond. As examples there may be mentioned bis-(4-hydroxyphenyl)-methane,
1,1-bis-(4'-hydroxyphenyl)-ethane,
1,2-bis-(4'-hydroxyphenyl)-ethane,
1,1-bis-(4'-hydroxyphenyl)-cyclohexane,
bis-(4-hydroxyphenyl)-phenylmethane,
1,1-bis-(4'-hydroxyphenyl)-1-phenylethane,
4,4'-dihydroxy-diphenylether,
4,4'-dihydroxy-diphenylsulfide,
4,4'-dihydroxy-benzophenone and
4,4'-dihydroxy-diphenyl, and in particular 2,2-bis(4'-hydroxyphenyl)-propane and 4,4'-dihydroxy-diphenyl-sulfone. Bis-phenols which carry a further substituent in the o-position to the OH group, such as 2,2-bis-(3'-methyl-4'-hydroxy-phenyl)-propane can also be used, as well as the alkali metal salts of 1,5-dihydroxy-naphthalene and 2,6-dihydroxy-naphthalene.

The resulting polyarylene disulfimide sulfones consist essentially of recurring structural units of the general formula:

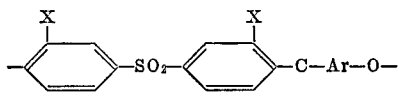

wherein X is hydrogen or halogen and Ar is a bivalent aromatic radical derived from a dihydroxy aromatic compound, such an amount of said bivalent aromatic radical having the general formula:

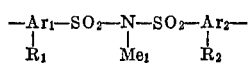

wherein Ar$_1$, Ar$_2$, R$_1$, R$_2$, and Me$_1$ are as disclosed above, that 1 kg. of said polyarylene disulfimide sulfone has a content of disulfimide groups amounting to at least 50 meq., the remainder having the general formula:

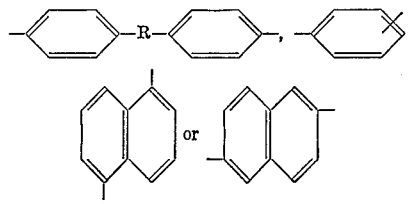

wherein R is as disclosed above.

To carry out the process according to the invention, the trisalkali metal salt of bis-hydroxyaryl-disulfimide, and if desired additionally, alkali metal salts of bis-phenols, are introduced together with 3,3', 4,4'-tetrachloro- and/or 3,4,4'-trichloro, and/or 4,4'-dichloro-diphenylsulfone in wanted proportions into one of the above mentioned solvents. The mixture is reacted at elevated temperature to form the linear polyarylene ether sulfone containing disulfimide groups. Alkali metal chloride is split off in the process. In order to avoid oxidative side reactions, the reaction is carried out under inert gas such as nitrogen or rare gas. High molecular weight polyarylene disulfimide sulfones suitable for extrusion, injection moulding and the production of foils and filaments however are only obtained by using alkali metal salts of the bis-phenolic components and polychlorodiphenylsulfones in equimolar quantities. An excess of one or other component leads to linear polyarylene disulfimide sulfones of lower molecular weight, the lowest molecular weight being obtained by reacting 2 moles of alkali metal salt of a bis-hydroxyaryl-disulfimide with 1 mole of a polychloro-diphenyl-sulfone. In order to prevent significant side reactions and decrease in molecular weight which is determined by the molar ratio of the bis-phenolic component and polychloro-diphenyl-sulfones, the water content of the reaction mixture should be less than 0.5 percent by weight.

Due to the hydrophilic character of the solvent and the difficulties in dosing anhydrous alkali metal salts of bis-hydroxyaryl disulfimides and bisphenols which may also be included, the anhydrous alkali metal salts are produced in situ in the solvent, if necessary in the presence of a solubilising agent. After that they are reacted with polychlorodiphenyl-sulfone to form a polyarylene disulfimide sulfone. The procedure consists in introducing bis-hydroxyaryldisulfimide into the solvent, for example dimethylsulfoxide in a flask which is continuously washed with nitrogen. Three equivalents of concentrated aqueous alkali metal hydroxide solution such as potassium hydroxide are then added. Water is distilled off azeotropically from this mixture at elevated temperature and if desired also at reduced pressure by means of a solubilising agent such as benzene, toluene, xylene, chlorobenzene or dichlorobenzene. The alkali metal salt is partly precipitated, excess of solubilising agent is also removed and the reaction mixture is cooled to room temperature. Then the calculated quantity of 3,3',4,4'-tetrachloro- and/or 3,4,4'-trichloro- and/or 4,4'-dichloro-diphenylsulfone is added, if necessary also more anhydrous solvent. The reaction mixture is then heated for several hours at a temperature above 90° C., preferably 100 to 160° C. Alkali metal chloride is precipitated and the polyarylene disulfimide sulfone is dissolved. In the case of equimolar quantities, high molecular weight linear polyarylene disulfimide sulfones result which are precipitated after cooling by pouring into water acidified with mineral acids. The polyarylene disulfimide sulfones having free disulfimide groups are isolated by filtration. If the precipitation is carried out with water or lower alcohols, the polyarylene disulfimide sulfones are isolated as alkali metal salts. In the case of an excess of alkali metal salt of bis-hydroxyaryl disulfimide, a polyarylene disulfimide sulfone of low molecular weight is obtained. If the solution of an alkali metal salt of one of the additional bis-phenols is added to this reaction solution so that the amount of the bis-phenolic components and polychlorodiphenylsulfones are equivalent, high molecular weight linear polyarylene disulfimide sulfones with a lower disulfimide group content can be obtained by several hours subsequent condensation at 100 to 160° C. This process for the preparation of mixed polyarylene disulfimide sulfones can be simplified by converting a mixture of bis-(4-hydroxyaryl)-disulfimide and a bis-phenol into the alkali metal salts and then reacting the mixture with the calculated quantity of polychlorodiphenylsulfone. The polymer content in the reaction solution may vary between 5 and 50%.

The solubilising agent used need not necessarily be removed quantitatively from the reaction mixture. In fact, it is often desirable to replace part of the expensive solvent by the less expensive solubilising agents. In order to obtain polyarylene disulfimide sulfones of high molecular weight, however, the solubilising agent should only be used in a quantity sufficient to prevent precipitation of polymer in the hot reaction mixture.

It is not absolutely necessary to use solubilising agents for the preparation of the alkali metal salts of bis-hydroxyaryl disulfimides or bis-phenols; instead, the water introduced into the reaction solution with the aqueous alkali may be distilled off with part of the solvent used.

High molecular weight linear polyarylene disulfimide sulfones produced in this way can be used in a finely divided form as cation exchangers. The products may also be worked up into moulded articles and sheets by extrusion or injection moulding processes. According to their solubility in N,N-dimethylformamide, N-dimethylpyrrolidone and chlorinated hydrocarbons, they may also be worked up from solutions to form foils and filaments. The products have good mechanical properties and dimensional stability over a wide range of temperature. They are very stable against oxidative degradation and acid and basic hydrolysis. They are readily dyed with basic dyes. To achieve good dyeability it is not necessary to produce such a mixed polyarylene disulfimide sulfone; it is also possible to mix a non-dyeable polyarylene ether sulfone with a polyarylene disulfimide sulfone prepared according to the present invention. The disulfimide content should be at least 50 meq. per kilogram of solids.

To test the dyeability foils are produced from the polyarylene disulfimide sulfones. These foils are dyed by a high temperature process with Astrazonblau B (Colour Index, 2nd ed., vol. III, No. 42140) under pressure as follows:

Liquor: 100 ml. Astrazonblau-B solution (c.=1 g./l.), 2 ml. dilute acetic acid (c.=30 g./l.) and 0.3 ml. of sodium acetate solution (c.=40 g./l.) are made up to 250 ml.
Temperature: 130° C.
Dyeing time: 1 hour The following examples are to illustrate the invention without limiting it. In the examples the relation parts by weight/parts by volume is the same as kg./liter.

EXAMPLE 1

35.1 parts by weight of bis(4-hydroxyphenyl)-disulfimide sodium are dissolved in 500 parts by volume of dimethyl sulfoxide. After the addition of a solution of 11.2 parts by weight of 100% solid potassium hydroxide in 20 parts by volume of water and 200 parts by volume of benzene, the water is removed from the system by azeotropic distillation while nitrogen is passed over. Benzene and 5 to 10% of dimethylsulfoxide are then distilled off in vacuo. The system then contains less than 0.4% water. 28.7 parts by weight of 4,4'-dichloro-diphenylsulfone are added at room temperature. The solution is heated to 130° C. and kept at this temperature for 24 hours while it is vigorously stirred and nitrogen is again passed over. By pouring the solution into about 1500 parts by volume of vigorously stirred methanol to which 15 parts by volume of conc. hydrochloric acid have been added, the slightly yellow polymer is kept in a state of fine dispersion. After filtration by suction, the product is washed until neutral and dried under vacuum at 100° C. 54.2 parts by weight (95.9% of the theory) of polymer melting in the range of 248 to 260° C. are obtained. The relative viscosity is $\eta_r=1.08$ (measured on a 0.2% by weight solution in dimethylformamide at 20° C.). A foil produced from this polycondensate shows good dyeability with Astrazonblau B (Colour Index, 2nd ed., vol. III, No. 42140).

EXAMPLE 2

17.55 parts by weight of bis-(4-hydroxyphenyl)-disulfimide sodium are dissolved together with 57.0 parts by weight of 2,2-bis-(4-hydroxyphenyl)-propane in 600 parts by volume of dimethylsulfoxide. A solution of 33.6 parts by weight of 100% solid potassium hydroxide in 40 parts by volume of water and 300 parts by volume of toluene are added. The water is removed by azeotropic distillation while nitrogen is passed over. Toluene and 5 to 10% dimethyl sulfoxide are then distilled off under vacuum. The system contains less than 0.4% water. After addition of 86.1 parts by weight of 4,4'-dichlorodiphenylsulfone at room temperature. The reaction mixture is heated to 130° C. and kept at this tempertaure for 24 hours while vigorously stirred. Nitrogen is passed over. The product is worked up as indicated in Example 1. 133.5 parts by weight of a white polycondensate (=96.3% of the theory) melting in a range of 230 to 252° C. and having a relative viscosity of $\eta_r=1.15$ (determined on a 0.2% by weight solution in dimethylformamide at 20° C.) are obtained. A foil produced from this polycondensate gives excellent results when dyed with Astrazonblau B (Colour Index, 2nd ed., vol. III, No. 41140). A comparison foil produced from the condensate of 2,2-bis-(4-hydroxyphenyl)-propane and 4,4'-dichloro-diphenylsulfone does not show any dyeability.

EXAMPLE 3

17.55 parts by weight of bis-(4-hydroxyphenyl)-disulfimide sodium are dissolved together with 11.4 parts by weight of 2,2-bis-(4-hydroxyphenyl)-propane in 300 parts by volume of tetramethylene sulfone. A solution of 8.0 parts by weight of 100%, solid sodium hydroxide in 20 parts by volume of water and 200 parts by volume of chlorobenzene is added. The water is removed by azeotropic distillation down to a content of less than 0.4% while nitrogen is passed over. The chlorobenzene is distilled off under vacuum. After cooling to room temperature, 35.6 parts by weight of 3,3',4,4'-tetrachloro-diphenylsulfone are added. The reaction mixture is then heated to 160° C. and condensed for 20 hours while it is stirred and nitrogen is passed over. The polycondensate is isolated and worked up as described in Example 1. 56.1 parts by weight of the white material (=98% of the theory) melting in a range of 248 to 262° C. and having a relative viscosity of $\eta_r=1.09$ (determined on a 0.2% by weight solution in dimethylformamide at 20° C.) are obtained. Foils obtained from this material can be dyed satisfactorily with Astrazonblau B (Colour Index, 2nd ed., vol. III, No. 41140). Foils from the condensate of 3,3',4,4'-tetrachloro-diphenylsulfone and bis-(4-hydroxyphenyl)-propane alone do not show dyeability.

EXAMPLE 4

17.55 parts by weight of bis-(4-hydroxyphenyl)-disulfimide sodium are dissolved together with 12.5 parts by weight of 4,4'-dihydroxy-diphenylsulfone in 600 parts by weight of 100%, solid potassium hydroxide in 20 parts by volume of water is then added. The water formed by salt formation and the added water are distilled off under vacuum together with 15 to 20% dimethylsulfoxide to reduce the water content of the system below 0.4%. 32.15 parts by weight of 3,4,4′-trichloro-diphenylsulfone are then added at room temperature. After the reaction mixture has been heated to 130° C., it is condensed for 24 hours at this temperature under stirring, nitrogen being passed over. Working up is carried out as indicated in Example 1. 52.4 parts by weight (=95.4% of the theory) of a colourless polycondensate melting within a range of 251 to 270° C. and having a relative viscosity of $\eta_r=1.09$ (determined on a 0.2% by weight solution in dimethylformamide at 20° C.) are obtained.

EXAMPLE 5

17.55 parts by weight of bis-(4-hydroxyphenyl)-disulfimide sodium are dissolved together with 8.0 parts by weight of 2,6-dihydroxy-naphthalene in 500 parts by volume of dimethylsulfoxide, and a solution of 11.2 parts by weight of 100%, solid potassium hydroxide in 200 parts by volume of water and 200 parts by volume of toluene are added. The water is removed by azeotropic distillation while nitrogen is passed over. Toluene and 5 to 10% dimethylsulfoxide are then distilled off under vacuum. 28.7 parts by weight of 4,4′-dichloro-diphenylsulfone are then added at room temperature. After the reaction mixture has been heated to 135° C., it is condensed for 24 hours while being stirred and nitrogen is passed over. The polymer is isolated and worked up as described in Example 1. 46.1 parts by weight of the slightly yellow polycondensate (=98.2% of the theory) melting in a range of 224 to 265° C. and having a relative viscosity $\eta_r=1.08$ (measured in a 0.2% by weight solution in dimethylformamide at 20° C.) are obtained. If 90.8 parts by weight of a polyether sulfone (melting range 230 to 258° C., $\eta_r=1.1$ (0.2% by weight in chloroform at 25° C.) prepared from 2,2-bis(4-hydroxyphenyl)-propane and 3,3′,4,4′-tetrachloro-diphenylsulfone are mixed with 9.2 parts by weight of the polyarylene disulfimide sulfone prepared as described above, 1000 g. of a polymer mixture are obtained containing about 100 meq. of acid disulfimide groups. Filaments and foils produced from this mixture can be readily dyed with basic dyes whilst comparison samples prepared without polyarylene disulfimide sulfone cannot be dyed.

What we claim is:
1. A polyarylene disulfimide sulfone consisting essentially of recurring structural units of the general formula:

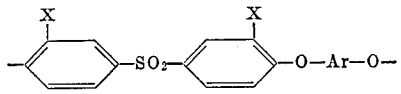

wherein X is hydrogen or halogen and Ar is a bivalent aromatic radical derived from a dihydroxy aromatic compound, such an amount of said bivalent aromatic radical having the general formula:

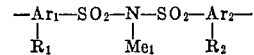

wherein $Ar_1$ and $Ar_2$ are phenylene or naphthylene; $R_1$ and $R_2$ are hydrogen, $C_1$-$C_4$ alkyl radicals, nitro or halogen; and $Me_1$ is an alkali metal, that 1 kg. of said polyarylene disulfimide sulfone has a content of disulfimide groups amounting to at least 50 meq., the remainder having the general formula:

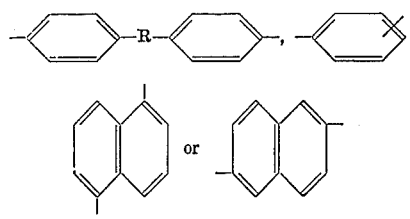

wherein R is a bivalent aliphatic, cycloaliphatic, or araliphatic radical having 1–9 carbon atoms, or the group —O—, —S—, —SO—, —SO$_2$—, —CO—, or a single bond.

References Cited

UNITED STATES PATENTS 3,264,536  8/1966  Robinson et al. _ _ _ _ _ _  317—258

FOREIGN PATENTS 698,893  12/1964  Canada.

WILLIAM H. SHORT, Primary Examiner

M. GOLDSTEIN, Assistant Examiner

U.S. Cl. X.R.

260—49, 823, 32.6, 30.2, 33.8; 8—4, 55